United States Patent [19]
Takata et al.

[11] Patent Number: 5,538,333
[45] Date of Patent: Jul. 23, 1996

[54] BRAKE FLUID PRESSURE CONTROLLER

[75] Inventors: Koji Takata; Teruhisa Kohno, both of Itami, Japan

[73] Assignee: Sumitomo Electric Industries, Ltd., Osaka, Japan

[21] Appl. No.: 389,235

[22] Filed: Feb. 15, 1995

[30] Foreign Application Priority Data

Feb. 16, 1994 [JP] Japan ..................................... 6-019232

[51] Int. Cl.⁶ ............................................... B60T 8/42
[52] U.S. Cl. ............................ 303/113.2; 303/DIG. 1
[58] Field of Search ........................... 303/113.1, 113.2, 303/116.1, 116.2, 119.1, 119.2, 85, DIG. 1, 139

[56] References Cited

U.S. PATENT DOCUMENTS

| | | | |
|---|---|---|---|
| 5,271,667 | 12/1993 | Takata et al. | 303/113.2 |
| 5,374,112 | 12/1994 | Takata et al. | 303/113.2 |
| 5,405,191 | 4/1995 | Nishiyama et al. | 303/113.2 |

FOREIGN PATENT DOCUMENTS

| | | | |
|---|---|---|---|
| 0539898A1 | 5/1993 | European Pat. Off. | |
| 3831426A1 | 4/1989 | Germany. | |
| 4009640C1 | 6/1991 | Germany. | |
| 4127040 | 2/1993 | Germany | 303/116.2 |
| 4128386A1 | 3/1993 | Germany. | |
| 5-65057 | 7/1991 | Japan. | |
| 6-80071 | 3/1994 | Japan | 303/113.2 |
| 6-191388 | 12/1994 | Japan. | |
| WO91/18776 | 12/1991 | WIPO. | |
| WO92/18363 | 10/1992 | WIPO. | |

*Primary Examiner*—Josie Ballato
*Attorney, Agent, or Firm*—Wenderoth, Lind & Ponack

[57] ABSTRACT

An arrangement for preventing the master cylinder of a brake system from getting damaged even if the brake fluid in the master cylinder reservoir is suctioned into the brake circuit during traction control. A wheel brake pressure control valve is provided in the main line. The system also includes a discharged fluid reservoir for storing fluid discharged from the control valve, a pump for returning the fluid in the discharged fluid reservoir into the fluid return point of the main line, a traction control changeover valve for checking any fluid flow from the fluid return point toward the master cylinder, and an intermediate reservoir provided in the supply line branching from the main line and adapted to communicate with the main line during normal braking. The system further includes a relief valve provided in a connecting line branching from the main line to check any fluid flow from the supply line toward the intermediate reservoir during traction control. Another changeover valve is provided to open and close communication between the intermediate reservoir and the discharged fluid reservoir.

20 Claims, 4 Drawing Sheets

BRAKE FLUID PRESSURE CONTROLLER

BACKGROUND OF THE INVENTION

This invention relates to a brake fluid pressure controller having functions both as an antilock controller and a traction controller.

An antilock controller in the simplest form is known as a fluid return type. It comprises a wheel brake fluid pressure control valve including a discharge valve and is provided in a main fluid line extending from the master cylinder to the wheel brakes, a discharged fluid reservoir for temporarily storing the brake fluid discharged from the discharge valve, and a circulation pump for suctioning brake fluid in the discharged fluid reservoir and returning it to the main fluid line.

If it is desired to add the traction control function to this device, the simplest and most efficient way to do so is to use the circulation pump as a pressure source for the traction control.

In order to use the pump for this purpose, it is necessary to supply brake fluid to the inlet port of the pump. There are several known methods for supplying brake fluid to the pump inlet.

These methods are roughly classified into two types. In one type, a fluid supply line is provided which extends directly from a reservoir of the master cylinder to the pump inlet. In the other type, such a fluid supply line branches from the main fluid line connecting the outlet of the master cylinder to a wheel brake. The latter arrangement is more advantageous because the entire device can be more easily mounted on the wheel and because there is no need to return brake fluid from the inlet of the master cylinder to its reservoir.

In the latter arrangement in which the fluid supply line branches from the main fluid line, it is necessary to provide a traction control changeover valve to check the fluid flow from the point at which the fluid discharged from the pump flows into the main fluid line, toward the master cylinder during traction control, and provide a shutoff valve to check the fluid flow from the fluid supply line toward the discharged fluid reservoir during a normal braking mode (while pressure is being applied to the master cylinder).

One problem with the latter arrangement is that the amount of brake fluid supplied to the pump tends to be limited due to intake resistance at the inlet of the master cylinder, flow resistance in the piping from the master cylinder to the brake fluid pressure controller, and flow resistance in the shutoff valve for closing the fluid supply line during normal braking, so that the brake fluid pressure may not rise quickly at the initial stage of traction control. One way to solve this problem is to provide an intermediate fluid reservoir in the fluid supply line.

The arrangement including such an intermediate fluid reservoir has the following problems.

Such an intermediate fluid reservoir is so adapted that when the fluid pressure in the intermediate fluid reservoir drops below the atmospheric pressure, its volume will decrease, so that the internal fluid pressure is always kept substantially equal to the atmospheric pressure. Upon completion of traction control, its volume increases by the force of a spring or the resilience of a rubber member until it becomes equal to the initial volume.

Thus, if the traction control continues for a long time, brake fluid in the reservoir of the master cylinder may be drawn through the fluid supply line into the intermediate fluid reservoir during traction control because of the tendency of the intermediate reservoir to return it to the high-volume side.

If the brake is applied while the brake fluid in the reservoir of the master cylinder is being suctioned into the intermediate reservoir during traction control, a greater amount of brake fluid than the brake fluid sucked into the brake circuit in an amount corresponding to the stroke of the brake pedal during a normal braking mode will be suctioned into the brake circuit.

If, in this state, the brake pedal is released, the cup seal in the master cylinder (in the case of a conventional master cylinder) or the rubber seal of center valve (in the case of a center-valve type master cylinder) will be gnawed by the side port when passing therethrough.

Such a problem could occur with any type of master cylinder, including the abovementioned conventional type, a center-valve type single master cylinder, conventional+conventional type, center valve+center valve type, or center valve+conventional tandem master cylinder, and other types (e.g. tilt-valve type).

SUMMARY OF THE INVENTION

An object of the present invention is to provide a brake fluid pressure controller in which excess brake fluid is prevented from being supplied into the brake circuit.

In order to achieve this object, the brake fluid pressure controller according to the present invention includes a traction control valve and further comprises an intermediate fluid reservoir which communicates with the main fluid line at least during a normal braking mode, and a second changeover valve provided between the fluid supply line and the discharged fluid reservoir for shutting off fluid communication between the fluid supply line and the discharged fluid reservoir during traction control.

This intermediate fluid reservoir is so arranged that when the internal pressure of the intermediate fluid reservoir drops below the atmospheric pressure, its volume will decrease until its internal pressure becomes substantially equal to the atmospheric pressure, that the intermediate fluid reservoir communicates with the fluid supply line while the volume of the intermediate fluid reservoir is smaller than its initial volume, and that the volume of the intermediate fluid reservoir increases while the fluid pressure of the reservoir of the master cylinder is being applied to the intermediate fluid reservoir.

During traction control, the second changeover valve completely shuts off fluid communication between the pump inlet and the fluid supply line.

Thus, the pump can suction only the fluid in the intermediate fluid reservoir and the discharged fluid reservoir. It will never suction fluid in the reservoir of the master cylinder.

According to this invention, an intermediate fluid reservoir is provided in the fluid supply line. The reservoir is so arranged that when the internal pressure of the intermediate fluid reservoir drops below the atmospheric pressure, its volume decreases until its internal pressure becomes substantially equal to the atmospheric pressure, that it communicates with the fluid supply line while its volume is smaller than its initial volume, and that its volume increases while the fluid pressure of the reservoir of the master cylinder is being applied to the intermediate fluid reservoir. With this arrangement, it is possible to eliminate the influence of the intake resistance at the inlet of the master cylinder and the flow resistance in the piping from the master cylinder to the brake fluid pressure controller. This makes it possible to supply brake fluid to the pump with a higher efficiency. Thus, it is possible to raise the brake fluid pressure sufficiently quickly at the initial stage of traction control while keeping the structure of the entire controller as simple as possible.

According to this invention, fluid communication between the pump inlet and the fluid supply line is completely shut off during traction control. Thus, there is no possibility of the brake fluid in the reservoir of the master cylinder being sucked into the pump during traction control. Thus, it is possible to prevent damage to the master cylinder.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
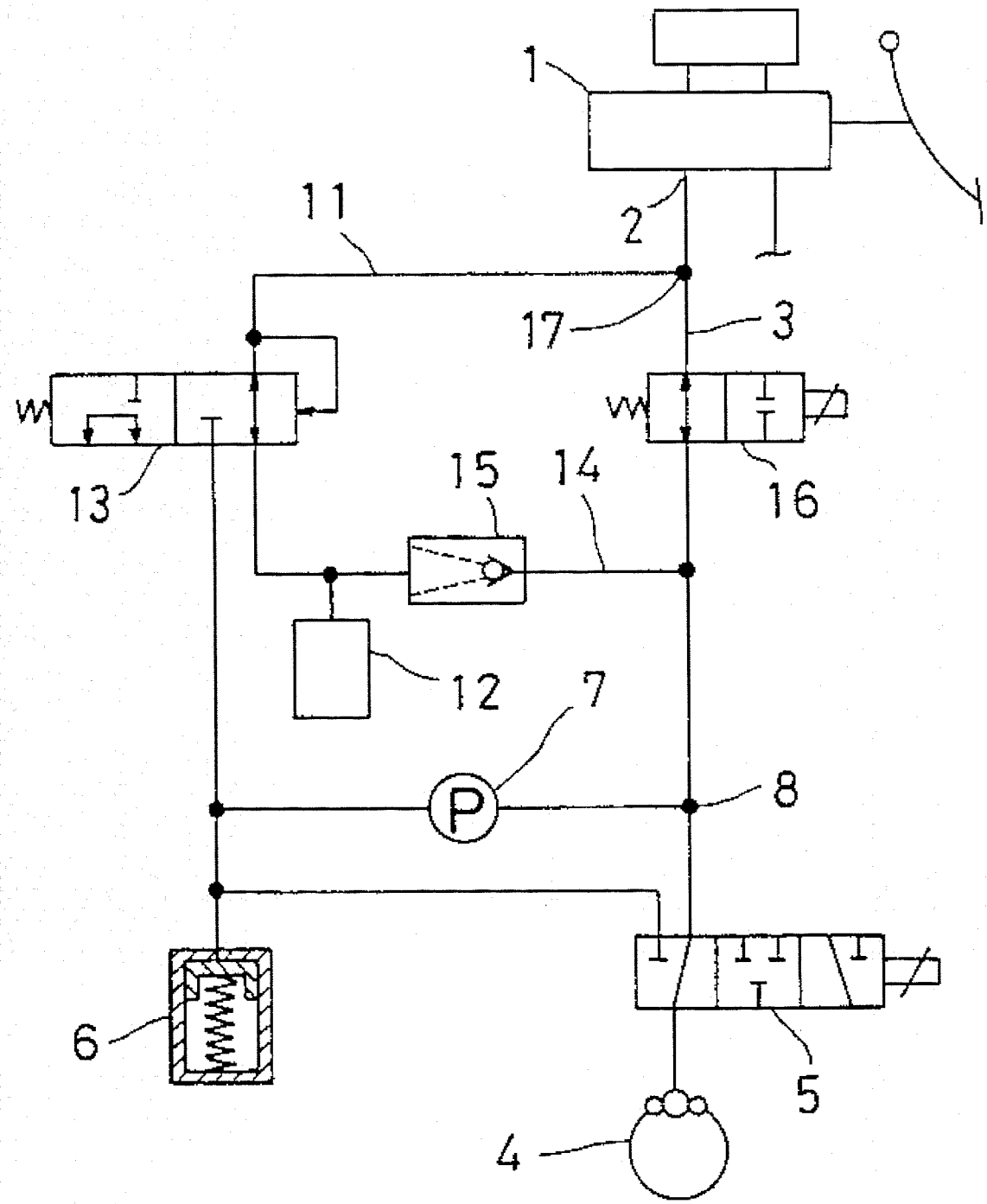
FIG. 1 is a circuit diagram of First Embodiment of the present invention.

FIG. 1 shows a three-position control ABS (antilock brake system). In this arrangement, the main fluid line communicates with the fluid supply line at all times. The traction control changeover valve used in this embodiment is a two-port, two-position valve provided between a branching point at which the fluid supply line branches from the main fluid line and a fluid return point at which the fluid discharged from the pump returns to the main fluid line.

A master cylinder 1, which is operated by a brake pedal, has two fluid outlets 2 (a booster may be added to the master cylinder). Since two lines from the two outlets are identical, we will describe only one of them.

A wheel brake fluid pressure control valve 5 having a discharge valve is provided in a main fluid line 3 through which the outlet 2 communicates with a wheel brake 4. This valve 5 may be a three-position type which can be changed over among three positions, i.e. pressure-increase, pressure-hold and pressure-decrease positions. Otherwise, it may be a two-position type that lacks the pressure-hold position. In many cases, check valves are provided parallel to this control valve to allow quick brake pressure reduction when the brake pedal is slackened during antilock control (though not shown in the drawings).

While the wheel brake fluid pressure control valve 5 is in the fluid discharge position, the wheel brake 4 communicates with a discharged fluid reservoir 6.

A pump 7 suctions brake fluid in the discharged fluid reservoir 6 and feeds it toward a fluid return point 8 in the main fluid line. Though not shown, a combination of a fluid reservoir as a damper and a throttle is frequently used to avoid pulsation of the flow of fluid that has been discharged from the pump 7.

We have so far described the basic construction of a fluid-return type antilock brake fluid pressure controller. In order that this system can be used for traction control as well, the following elements are added.

A fluid supply line 11 is provided which branches from the main fluid line 3 at a branch point 17 upstream of the fluid return point 8 and leads to an intermediate fluid reservoir 12. A second changeover valve 13 is provided in the fluid supply line 11 between the discharged fluid reservoir 6 and an intermediate fluid reservoir 12.

A relief valve 15 is provided in a line 14 through which the intermediate reservoir 12 communicates with the main fluid line 3. It discharges brake fluid in the fluid communication line 14 into the intermediate fluid reservoir if the pressure in the fluid communication line 14 exceeds a maximum pressure necessary for traction control. A traction control changeover valve 16 including a shutoff valve is provided in the main fluid line 3 at a point between the branch point 17 and the fluid return point 8.

Figure 4:
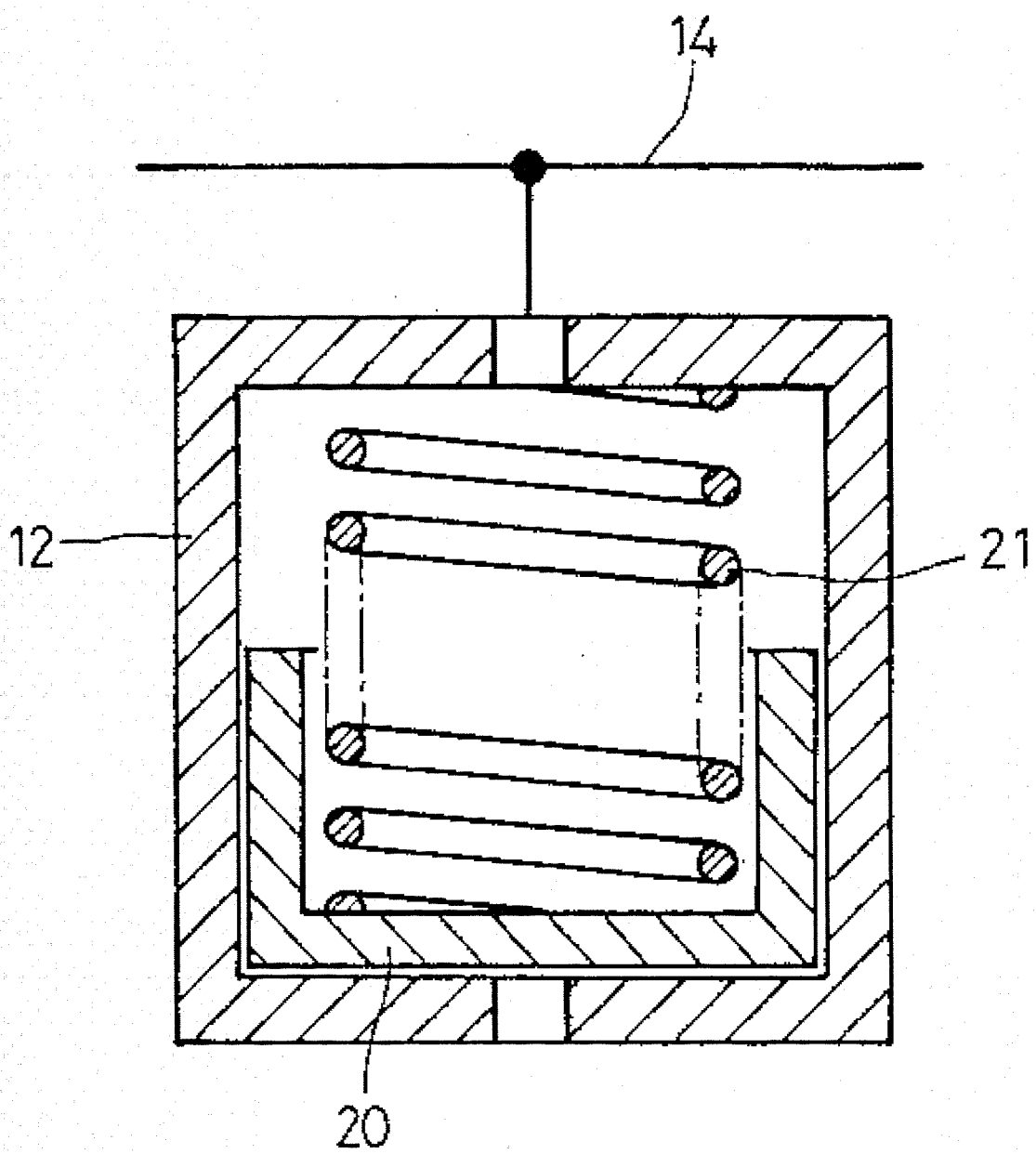
FIG. 4 is an enlarged vertical sectional view of an embodiment of the intermediate fluid reservoir.

As shown in FIG. 4, the intermediate fluid reservoir 12 accommodates a piston 20 and a spring 21 and has top and bottom openings through which its interior communicates with the fluid line 14 and the atmosphere, respectively. When the interior pressure drops below the atmospheric pressure, the piston 20 will be pushed up by the atmospheric pressure while pressing the spring. As a result, the effective reservoir volume decreases.

The wheel brake fluid pressure control valve 5 in this embodiment is a three-port, three-position electromagnetic changeover valve which can be changed over among pressure-increase, pressure-hold and pressure-reduction positions. The second changeover valve 13 is a three-port, two-position pressure-responsive changeover valve. As the traction control changeover valve 16, an electromagnetic changeover valve is used.

Though not shown, this system has an electronic control unit for controlling the control valve 5, changeover valve 16, and the pump 7, in response to wheel speed signals from wheel speed sensors.

In this embodiment, during normal braking mode, the wheel brake fluid pressure control valve 5 is in the position shown in FIG. 1 in which the main fluid line 3 is shut off from the discharged fluid reservoir 6 and communicates with the wheel brake 4.

During normal braking and antilock control mode, with the pressure from the master cylinder overcoming the bias by the spring force, the second changeover valve 13 takes the position shown in FIG. 1 in which the intermediate fluid reservoir 12 communicates with the fluid supply line 11.

During the traction control mode, the traction control changeover valve 16 is activated to close the main fluid line 3 between the points at which the fluid supply line 11 and the fluid line 14 connect with the main fluid line, respectively. In this state, the second changeover valve 13, triggered by the master cylinder pressure, will take a spring-biassed normal position where the intermediate fluid reservoir 12 is shut off from the fluid supply line 11 and communicates with the discharged fluid reservoir 6.

Thus, in this state, the pump 7 suctions up fluid only from the intermediate fluid reservoir 12 and the discharged fluid reservoir 6. In other words, it will never suction fluid from the reservoir of the master cylinder 1.

Figure 2:
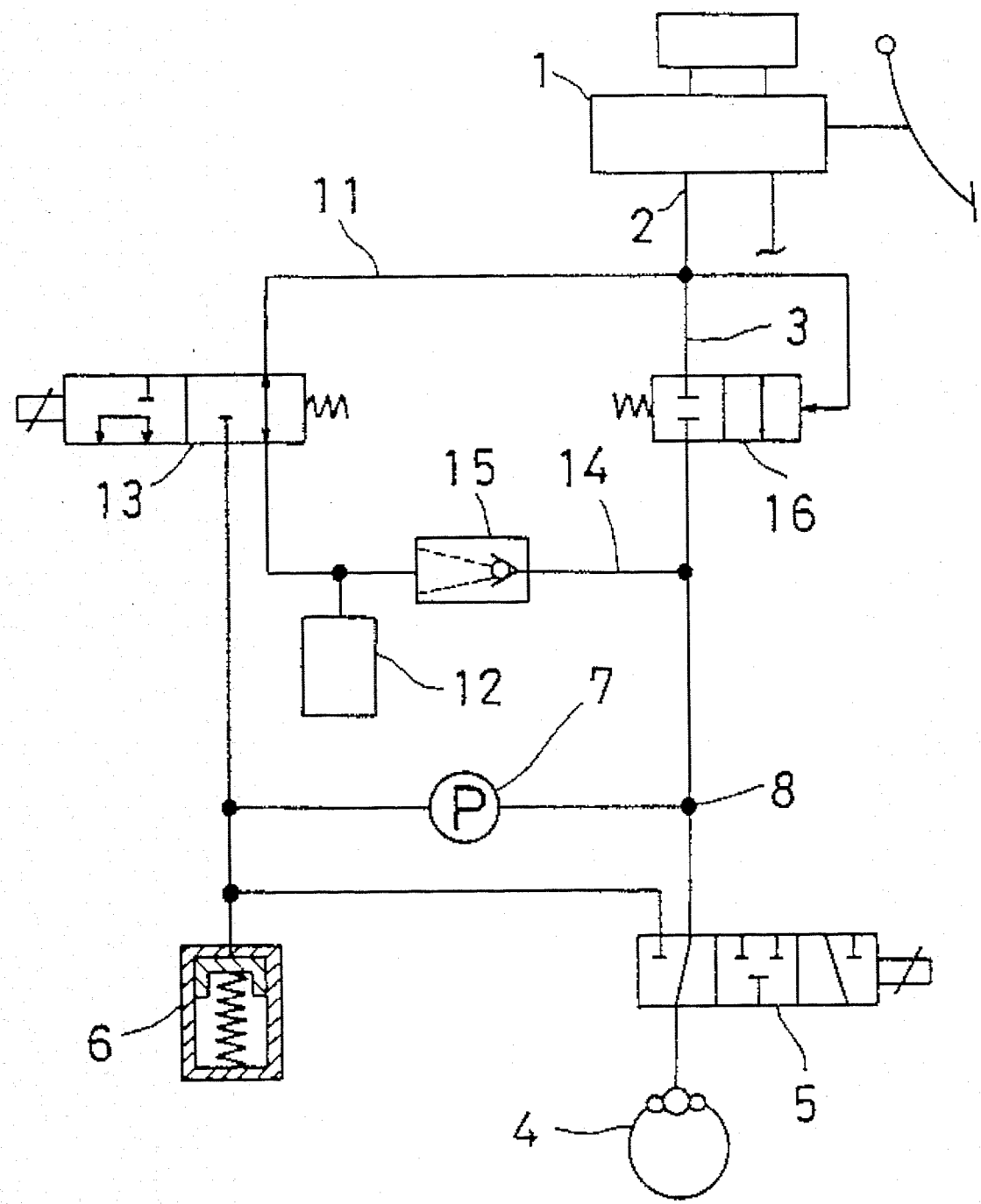
FIG. 2 is a circuit diagram of a Second Embodiment.

In the second embodiment shown in FIG. 2, an electromagnetic changeover valve is used as the second changeover valve 13, while a pressure-responsive type changeover valve is used as the traction control changeover valve 16. FIG. 2 shows the state in which none of normal braking, antilock or traction control is in operation. Otherwise, this embodiment is the same as the first embodiment. Thus, the same parts are denoted by the same numerals and their description is omitted.

Figure 3A:
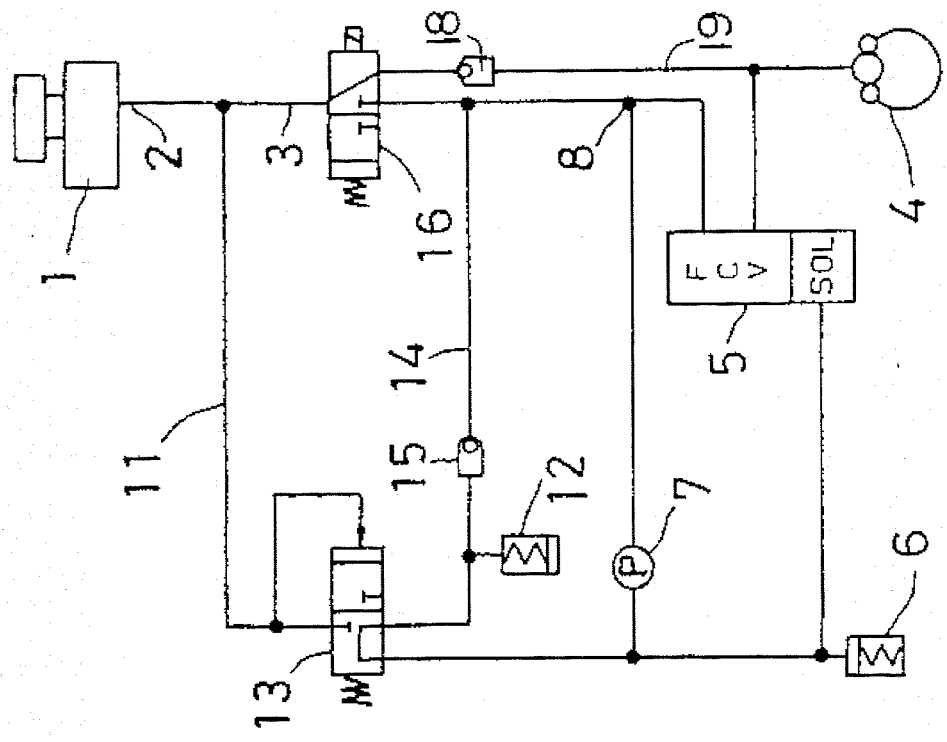
FIGS. 3A and 3B are circuit diagrams of a Third Embodiment.
Figure 3B:
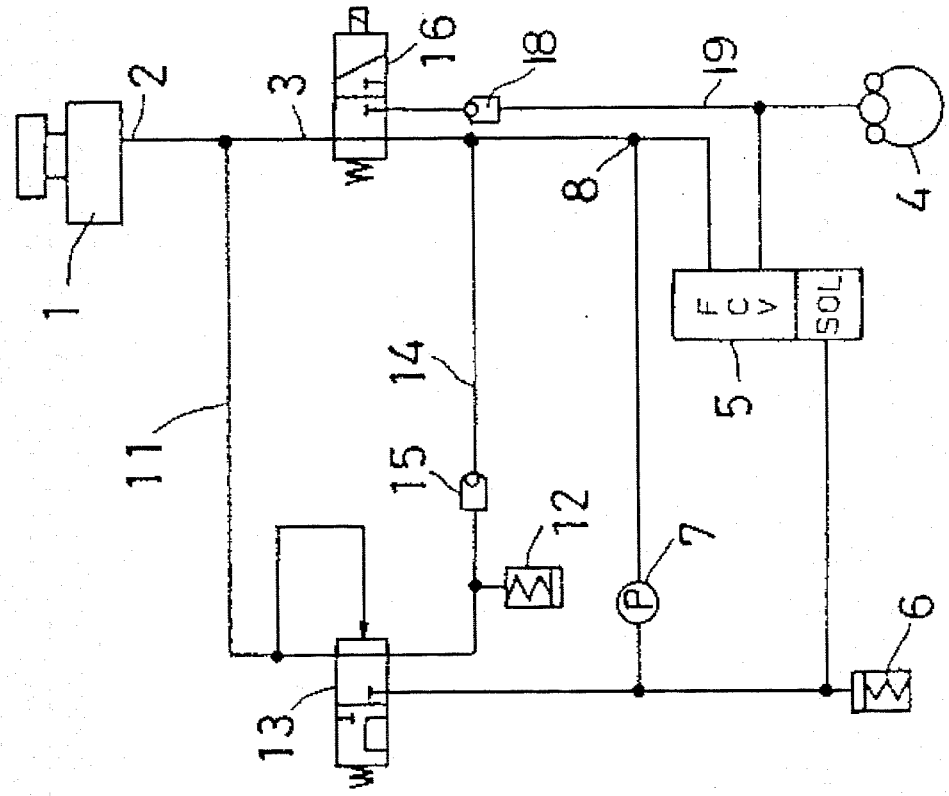

The controller of the third embodiment shown in FIGS. 3A and 3B is a two-position control ABS. As the traction control changeover valve 16, a three-port, two-position electromagnetic changeover valve is used. As the second changeover valve 13, a pressure-responsive type changeover valve is used which is triggered by the master cylinder pressure. The wheel brake fluid pressure control valve is again represented by reference number 5 in a simplified schematic form.

In this arrangement, the three-port, two-position traction control changeover valve 16 is connected so that the master cylinder 1 communicates with the wheel cylinder during traction control through a check valve 18 and fluid line 19. Thus, it is possible to increase the brake pressure sharply when a sharp brake is applied during traction control.

FIG. 3A shows the state during normal braking mode. FIG. 3B shows the state during traction control mode.

What is claimed is:

1. A brake fluid pressure controller, comprising:

a master cylinder;

a main fluid line extending from said master cylinder to a wheel brake;

a wheel brake fluid pressure control valve provided in said main fluid line between said master cylinder and said wheel brake, said wheel brake fluid pressure control valve comprising a discharge valve;

a discharged fluid reservoir connected with said discharge valve of said wheel brake fluid pressure control valve for temporarily storing brake fluid discharged from said discharge valve;

a pump connected between said discharged fluid reservoir and said main fluid line at a fluid return point in said main fluid line between said master cylinder and said wheel brake fluid pressure control valve for suctioning brake fluid from said discharged fluid reservoir and returning the brake fluid to said main fluid line at said fluid return point;

a traction control changeover valve in said main fluid line between said master cylinder and said fluid return point for checking fluid flow from said fluid return point toward said master cylinder during traction control;

a fluid supply line extending from said main fluid line at a point between said traction control changeover valve and said master cylinder;

an intermediate fluid reservoir located in said fluid supply line for communicating with said main fluid line during a normal braking mode;

a fluid communication line extending from said main fluid line at a point between said traction control changeover valve and said wheel brake to said intermediate fluid reservoir;

a relief valve in said fluid communication line for discharging brake fluid from said main fluid line to said intermediate reservoir if the pressure in said fluid communication line exceeds a maximum pressure necessary for traction control; and a second changeover valve means for checking brake fluid flow from said fluid supply line toward said intermediate fluid reservoir and communicating said discharged fluid reservoir with said intermediate fluid reservoir during traction control.

2. The brake fluid pressure controller of claim 1, wherein said second changeover valve means has a normal braking mode and antilock braking control mode position in which said fluid supply line is in communication with said intermediate fluid reservoir.

3. The brake fluid pressure controller of claim 2, wherein said intermediate fluid reservoir has an initial volume from which the volume of said intermediate fluid reservoir can decrease, and comprises means for, when the internal pressure of said intermediate fluid reservoir drops below atmospheric pressure, decreasing the volume until the internal pressure of said intermediate fluid reservoir becomes substantially equal to atmospheric pressure, wherein said intermediate fluid reservoir communicates with said fluid supply line while the volume of said intermediate fluid reservoir is smaller than the initial volume, and wherein the volume of said intermediate fluid reservoir increases when a fluid pressure from said master cylinder is applied to said intermediate fluid reservoir.

4. The brake fluid pressure controller of claim 2, wherein said second changeover valve means is a pressure responsive changeover valve responsive to fluid pressure from said master cylinder.

5. The brake fluid pressure controller of claim 2, wherein said traction control changeover valve is a pressure responsive changeover valve responsive to fluid pressure from said master cylinder.

6. The brake fluid pressure controller of claim 2, wherein said traction control changeover valve is a three-port, two-position valve located in said main fluid line at a point between where said fluid supply line connects to said main fluid line and said wheel brake, has two ports in said main fluid line and a third port connected through a further line to said wheel brake, and can selectively fluidly communicate said master cylinder with one of said fluid return point and said wheel brake.

7. The brake fluid pressure controller of claim 1, wherein said intermediate fluid reservoir has an initial volume from which the volume of said intermediate reservoir can decrease, and comprises means for, when the internal pressure of said intermediate fluid reservoir drops below atmospheric pressure, decreasing the volume until the internal pressure of said intermediate fluid reservoir becomes substantially equal to atmospheric pressure, wherein said intermediate fluid reservoir communicates with said fluid supply line while the volume of said intermediate fluid reservoir is smaller than the initial volume, and wherein the volume of said intermediate fluid reservoir increases when a fluid pressure from said master cylinder is applied to said intermediate fluid reservoir.

8. The brake fluid pressure controller of claim 1, wherein said second changeover valve means is a pressure responsive changeover valve responsive to fluid pressure from said master cylinder.

9. The brake fluid pressure controller of claim 1, wherein said traction control changeover valve is a pressure responsive changeover valve responsive to fluid pressure from said master cylinder.

10. The brake fluid pressure controller of claim 1, wherein said traction control changeover valve is a three-port, two-position valve located in said main fluid line at a point between where said fluid supply line connects to said main fluid line and said wheel brake, has two ports in said main fluid line and a third port connected through a further line to said wheel brake, and can selectively fluidly communicate said master cylinder with one of said fluid return point and said wheel brake.

11. A brake fluid pressure controller, comprising:

a master cylinder;

a main fluid line extending from said master cylinder to a wheel brake;

a wheel brake fluid pressure control valve provided in said main fluid line between said master cylinder and said wheel brake, said wheel brake fluid pressure control valve comprising a discharge valve;

a discharged fluid reservoir connected with said discharge valve of said wheel brake fluid pressure control valve;

a pump connected between said discharged fluid reservoir and said main fluid line at a fluid return point in said main fluid line between said master cylinder and said wheel brake fluid pressure control valve;

a traction control changeover valve in said main fluid line between said master cylinder and said fluid return point;

a fluid supply line extending from said main fluid line at a point between said traction control changeover valve and said master cylinder;

an intermediate fluid reservoir located in said fluid supply line;

a fluid communication line extending from said main fluid line at a point between said traction control changeover valve and said wheel brake to said intermediate fluid reservoir;

a relief valve in said fluid communication line operable to allow brake fluid to flow from said main fluid line to said intermediate fluid reservoir above a predetermined pressure; and a second changeover valve located in said fluid supply line between said main fluid line and said intermediate fluid reservoir, said second changeover valve being further connected with said discharged fluid reservoir, said second changeover valve having a traction control position in which said main fluid line is out of communication with said intermediate fluid reservoir through said fluid supply line and said intermediate fluid reservoir is in fluid communication with said discharged fluid reservoir.

12. The brake fluid pressure controller of claim 11, wherein said second changeover valve has a normal braking mode and antilock braking control mode position in which said fluid supply line is in communication with said intermediate fluid reservoir.

13. The brake fluid pressure controller of claim 12, wherein said intermediate fluid reservoir has an initial volume from which the volume of said intermediate fluid reservoir can decrease, and comprises means for, when the internal pressure of said intermediate fluid reservoir drops below atmospheric pressure, decreasing the volume until the internal pressure of said intermediate fluid reservoir becomes substantially equal to atmospheric pressure, wherein said intermediate fluid reservoir communicates with said fluid supply line while the volume of said intermediate fluid reservoir is smaller than the initial volume, and wherein the volume of said intermediate fluid reservoir increases when a fluid pressure from said master cylinder is applied to said intermediate fluid reservoir.

14. The brake fluid pressure controller of claim 12, wherein said second changeover valve is a pressure responsive changeover valve responsive to fluid pressure from said master cylinder.

15. The brake fluid pressure controller of claim 12, wherein said traction control changeover valve is a pressure responsive changeover valve responsive to fluid pressure from said master cylinder.

16. The brake fluid pressure controller of claim 12, wherein said traction control changeover valve is a three-port, two-position valve located in said main fluid line at a point between where said fluid supply line connects to said main fluid line and said wheel brake, has two ports in said main fluid line and a third port connected through a further line to said wheel brake, and can selectively fluidly communicate said master cylinder with one of said fluid return point and said wheel brake.

17. The brake fluid pressure controller of claim 11, wherein said intermediate fluid reservoir has an initial volume from which the volume of said intermediate reservoir can decrease, and comprises means for, when the internal pressure of said intermediate fluid reservoir drops below atmospheric pressure, decreasing the volume until the internal pressure of said intermediate fluid reservoir becomes substantially equal to atmospheric pressure, wherein said intermediate fluid reservoir communicates with said fluid supply line while the volume of said intermediate fluid reservoir is smaller than the initial volume, and wherein the volume of said intermediate fluid reservoir increases when a fluid pressure from said master cylinder is applied to said intermediate fluid reservoir.

18. The brake fluid pressure controller of claim 11, wherein said second changeover valve is a pressure responsive changeover valve responsive to fluid pressure from said master cylinder.

19. The brake fluid pressure controller of claim 11, wherein said traction control changeover valve is a pressure responsive changeover valve responsive to fluid pressure from said master cylinder.

20. The brake fluid pressure controller of claim 11, wherein said traction control changeover valve is a three-port, two-position valve located in said main fluid line at a point between where said fluid supply line connects to said main fluid line and said wheel brake, has two ports in said main fluid line and a third port connected through a further line to said wheel brake, and can selectively fluidly communicate said master cylinder with one of said fluid return point and said wheel brake.

* * * * *